United States Patent [19]

Wexelblat et al.

[11] Patent Number: 5,021,976

[45] Date of Patent: Jun. 4, 1991

[54] METHOD AND SYSTEM FOR GENERATING DYNAMIC, INTERACTIVE VISUAL REPRESENTATIONS OF INFORMATION STRUCTURES WITHIN A COMPUTER

[75] Inventors: Alan D. Wexelblat; Kim M. Fairchild, both of Austin, Tex.

[73] Assignee: Microelectronics and Computer Technology Corporation, Austin, Tex.

[21] Appl. No.: 271,091

[22] Filed: Nov. 14, 1988

[51] Int. Cl.$^5$ .............................................. G06F 3/153
[52] U.S. Cl. .................................. 364/521; 364/518; 364/146; 340/747
[58] Field of Search ............... 364/518, 521, 522, 146, 364/141; 340/721, 723, 747, 750, 798–800

[56] References Cited

U.S. PATENT DOCUMENTS

| 4,752,893 | 6/1988 | Guttag et al. ................... 364/521 X |
| 4,772,882 | 9/1988 | Mical .............................. 364/521 X |
| 4,813,013 | 3/1989 | Dunn .............................. 364/521 X |
| 4,814,755 | 3/1989 | Johnson et al. ................ 364/521 X |
| 4,823,283 | 4/1989 | Diehm et al. ....................... 364/518 |

OTHER PUBLICATIONS

Steamer: An Interactive Inspectable Simulation-Based Training System, by James D. Hollan, Edwin L. Hutchins and Louis M. Weitzman, dated 1984.

"Direct Manipulation Interfaces", by Edwin L. Hutchins, James D. Hollan and Donald A. Norman, Human-Computer Interaction, 1985, vol. I, pp. 311–338.

"Graphic Interfaces for Simulation", Advances in Man-Machine Systems Research, vol. 3, pp. 129–163 (JAI Press, Inc. 1987).

"SemNet: Three-Dimensional Graphic Representations of Large Knowledge Bases", *Cognitive Science and Its Applications for Human Computer Interaction*, Kim Fairchild, S. Poltrock and G. P. Furnas, Lawrence Erlbaum Associates, 1987.

"Picture Generation Using Semantic Nets", R. D. Giustini, M. D. Levine, and A. S. Malowany, Computer Graphics and Image Processing, vol. 7, pp. 1–29, Academic Press, Inc., 1978.

"Human Factors in Data Access", T. K. Landauer, S. T. Dumais, L. M. Gomez and G. W. Furnas, Bell System Technical Journal, vol. 61, No. 9, Nov. 1982.

"Generalized Fisheye Views", G. W. Furnas, *Human Factors in Computing Systems*, Apr. 1986.

"The Alternate Reality Kit", Randall B. Smith, 1986 *IEEE Computer Society Workshop on Visual Languages*, Jun. 1986.

*Primary Examiner*—Heather R. Herndon
*Attorney, Agent, or Firm*—Johnson & Gibbs

[57] ABSTRACT

A method and system for generating dynamic, interactive visual representations of information structures within a computer which enable humans to efficiently process vast amounts of information. The boundaries of the information system containing the information to be processed are established and a set of mathematical relationships is provided which indicates the degree of correlation between parameters of interest to a user and segments of information contained within the boundaries. A visual display is generated for the user which has a plurality of different iconic representations and visual features corresponding to the parameters defined by the mathematical relationships. The iconic representations and visual features of the visual display change with the movement of the mathematical relationships within the boundaries of the information system according to the degree of correlation between the parameters of interest and the segment of information through which the mathematical relationships are passing.

30 Claims, 3 Drawing Sheets

METHOD AND SYSTEM FOR GENERATING DYNAMIC, INTERACTIVE VISUAL REPRESENTATIONS OF INFORMATION STRUCTURES WITHIN A COMPUTER

BACKGROUND OF THE INVENTION

1. Field of the Invention

The invention relates to human interface with information systems, and, more particularly, to a computer system for inspecting and modifying data contained within an information system.

2. History of the Prior Art

Two results of the rapid increase in available facilities with huge capacities for data storage and with enhanced speeds for manipulating data are the accumulation of vast complexes of information spaces and the interconnection of networks of such spaces. The term "semantic network" is used herein for a set of information organized along a particular conceptual line, while the term "cyberspace" is used herein for a large pool of complex information organized along virtually every conceptual line that can be thought of. One of the problems associated with such huge cyberspaces is how to determine optimum ways for human operators to interact with meaningful subsets of information contained within a cyberspace. Although humans are wonderful cognitive processors of information, they rapidly become saturated and ineffectual when confronted with too much information at one time.

In the management and use of large cyberspaces of information, the principal human problem is how to enable people to navigate through the information space focusing on specific information without losing their awareness of information at the global level. More particularly, there is the problem of how to enable a user to interact efficiently with the information contained in a large information system. A user must be able to rapidly inspect, select, and modify data within a system if this data is to be widely and effectively used.

While highly skilled programmers and other such users may be able to meaningfully interpret lines of code on a display screen, most users cannot. For this reason, application programs have often incorporated various types of graphical displays to communicate information about the internal condition and operation of the information system. Such graphical display interface systems enable the user to make program selections and provide other input related to the information processing activity. One particularly useful tool for interfacing with an information system has been the graphical symbols called "icons."

An icon is a small pictorial representation of some larger set of information. Icons have been used for many years as a way to graphically indicate certain information about the contents of a system or state of operation. Generally, icons fit into one of two categories: static or dynamic. A static icon is simply a picture of something that indicates a condition within a computer system. For example, it could be an image of a window within a windowing system, which has been closed down and put into the background of the display. Alternatively, it could be a picture of an unopened document in a word processor type of information system. Overall, it is a simple, static picture on a display screen, connoting certain encoded information in the mind of a human operator.

A second kind of icon employed in the past is also in the static category, although it incorporates a certain amount of dynamism. This dynamism reflects a certain activity in the information or in the condition of the system represented by the icon. For example, one icon employed in a windowing system appears when a window is closed as a shrunken representation of the window. If some new text appears in the window while it is closed down, the text is also represented in the icon, but in a proportionally smaller size. That is, some additional information appears in the icon when changes occur in the system, but that information is treated as a change going on in the background, to which the operator is paying little attention.

A related type of icon, which is basically static but which incorporates a certain amount of dynamism, is the animated icon. For example, in one application program, a trash can grows in size as the user discards files without emptying the trashcan's contents. While only three actual sizes of icons are used—a normal slim size, an intermediate size, and a very full size—they are displayed sequentially to connote growth to the user. Each of the individual graphical images comprising the animated icon is static in that it is fixed in size; the composite appears to move only as the result of an animated illusion.

Highly sophisticated animated icons have also been used to provide graphical interfaces for computer simulations of complex physical systems. By way of illustration, numerous editorially selectable animated icons are used in the interactive, inspectable, simulation-based instructional steam power plant system described in "Graphic Interfaces for Simulation," *Advances in Man-Machine Systems Research*, Vol. 3, pp. 129-163 (JAI Press, Inc. 1987). Each of these icons is directly connected to respond to an associated variable within the mathematical simulation algorithm to indicate the existence of particular conditions within the simulated physical system.

The icon is an extremely useful tool because it is designed to trigger within the mind of the human operator concepts that quickly communicate the contents or operation of the information system. Most icons are either static or animated and are connected so that they respond directly to either an information system condition or a variable within a simulation algorithm. If an icon could instead be coupled to a means for moving through and inspecting the contents of an information system and graphically depicting the results of that inspection, it could be used to great advantage in communicating information about large cyberspaces of information. The present invention proposes such an automatically generated icon system for enabling a user to interface with data contained within an information system.

SUMMARY OF THE INVENTION

The system of the present invention includes the definition of mathematical relationships that are movable within an information space. The system also defines a means for relating to that information space in accordance with a set of criteria delineating a plurality of parameters that are of potential interest to a user. An automatic icon is defined by associating certain graphical primitives with certain mathematical relationships so that as an embodiment of the relationships are moved through an information space, the appearance of the icon automatically changes as a result of the correlation between the mathematical relationships and the contents of the information space.

The present invention also includes a method for moving through and examining the contents of a knowledge space by means of a set of criteria. A graphical icon is automatically generated in response to the relationship between the criteria and the observer's location within the knowledge space. This icon visually represents what is being observed within the space.

One aspect of the present invention includes a system for enabling a user to interact with information contained within an information system. The boundaries of the system containing the information are established, and a set of mathematical relationships is provided to define a plurality of parameters of potential interest to the user. The mathematical relationships are capable of indicating a degree of correlation between the parameters defined by the relationships and the segments of information contained with the boundaries of the information system. A visual display is generated that has a variety of visual features each of which can assume various conditions over a range of different possible conditions. The parameters defined by the mathematical relationships are associated with corresponding features of the display. An embodiment of the set of mathematical relationships is moved within the boundaries of the information system and interacts with the information system to produce a visual display. The features of this display indicate the degree of correlation between the associated parameters of interest to the user and the segment of information through which the embodiment is passing.

The visual display can also enable the user to interact with the features of the display and to provide input about a desired change in the degree of correlation between a selected parameter and an associated segment of information. The system includes the means for changing the content of the segment of information through which the embodiment of the mathematical relationships is passing and establishing the degree of correlation indicated by the user's interaction with the display.

In a different aspect, the present invention includes a system for interacting with an information system that uses memory to store data and that connects a processor to the memory to access selected segments of the data. A display is connected to the processor. Generated on the display is an icon that has a plurality of features, each of which is capable of changing in appearance over a range of different possible appearances. A set of mathematical relationships contained in the processor defines a plurality of parameters of potential interest to the user. The mathematical relationships are capable of indicating a degree of correlation between the parameters defined by the mathematical relationships and the segments of the data. The system is responsive to indicate the degree of correlation between the parameters defined by the relationships and the data, and it automatically generates a particular corresponding appearance in an associated feature of the icon. The features of the icon represent the relationships between the parameters of interest to the user and the segment of data to which the mathematical relationships have access at each sequential period of time.

BRIEF DESCRIPTION OF THE DRAWING

For a more complete understanding of the present invention and for further objects and advantages thereof, refer to the following description, in conjunction with the accompanying drawings.

DESCRIPTION OF THE PREFERRED EMBODIMENTS

Artificial Reality Models

A helpful technique for the management and use of cyberspaces of information is the creation of dynamic visual representations of subsets of cyberspace. These subsets are represented as a collection of automatic icons that map abstract semantic entities from that subset into graphical forms that people can edit and manipulate. These representations may take the form of computer-maintained worlds, or artificial realities, governed in accordance with specific rules to define the subsets of cyberspace presented, the form of the presentation of the information, and the operator actions required to manipulate the artificial reality artifacts that make up the worlds. That is, the artificial realities create a human-understandable structure out of and within cyberspaces of information and provide a conceptual framework for communication with the cyberspace by a single individual or by groups of individuals.

Three conceptual underpinnings support the creation of artificial realities: multiple views of information, hierarchical object structures, and semantic navigation. These three concepts are fundamental to the present system, which allows the user to interact with data contained in such information systems.

Figure 1:
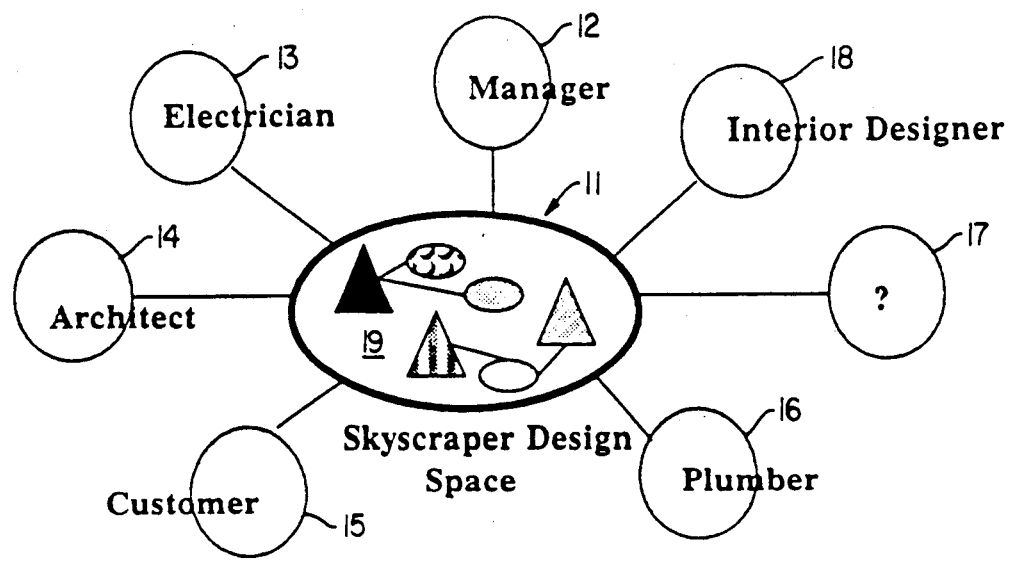
FIG. 1 is a diagram that depicts multiple views of an illustrative knowledge space.

FIG. 1 is a conceptual illustration of a central knowledge base 11 for a skyscraper design that comprises a plurality of views 12-18 of the base. These multiple views are used to create the artificial reality so that many different individuals can use it. The design space in FIG. 1 is that of a skyscraper, and the different views are those of the customer 15, the architect 14, the plumber 16, and others. The view associated with the customer 15 is a traditional view of the skyscraper, and the customer's view is accorded controls for moving the viewpoint in a three-dimensional space, for performing relatively superficial changes within the space, and for communicating certain comments on the design to the architect.

In contrast, the view provided within the design space 1 for the plumber 16 is a floor-by-floor view that emphasizes where the piping is going within the skyscraper and that includes artificial reality artifacts that might interfere with the paths chosen for the piping. The plumber's view 16 may be given controls that allow the editing of plumbing topologies and that can access city plumbing codes, other design specifications, and other information related to this particular view. By way of further illustration, the architect 14 is the leader of the design team and requires many views of the cyberspace 11—for example, views for the management of the project, views for communication with other design team members, and views related to the performance of each of the contractors working within the space.

The different views created within the artificial reality for each of the team members together compose a specialized metaphorical representation of the skyscraper itself. Each view encodes design information into the form of artificial reality artifacts that have been given appropriate graphical representations and that interact with the other artifacts and with the user as if they were real.

To extend the artificial reality concept, traditional mathematical relationships and software techniques can be used to define a complete environment for the design of any particular system. One problem with using traditional software techniques to create such environments is that if the problem statement changes even slightly, many of the multiple views will have to be modified, frequently at great cost. It would be more useful to provide an artificial reality environment that is extendable, growing to accommodate new and various design tasks and including tools and facilities for creating and manipulating artificial realities themselves. This environment should support reuse of the artificial reality artifacts and contain libraries, specialized editors, and general artificial reality tools to support finding and modifying artifacts for any design task that may arise.

All artificial realities rely on a hierarchy of objects. These objects are created by means of a corresponding hierarchy of editors, each of which is specialized to produce the type of object needed. The relationships between these editors exactly parallel those of the objects they create. So if an object is a specialization of another object, its corresponding editor would be a specialization of the editor for the other object. In order to make it easier to create and manipulate these objects, specialized object editors can be used to change artifacts into the form most suited to the user's tasks. To support this editor infrastructure, various artificial reality objects are placed in the cyberspace and used to create the initial environment.

Since all artifacts share a basic artificial reality structure, only base editors are needed for the general construction of artifacts; however, it is typically desirable to provide specialized editors that are associated with each of the more important artifact classes. For example, in the artificial reality illustrated in FIG. 1, editors would be provided for writing notes from the customer to the architect and for changing both the artifacts within the world as well as the different viewpoints of the architect.

To minimize the amount of effort needed to set up each successive artificial reality, artifacts from previous projects are stored in a way that allows easy search and selection of artifacts to create another reality. Artifacts, artifact groups, and their associated editors may all be reused across various projects; however, since no two projects are completely identical, the artifacts may also be changed between projects. For example, in the skyscraper illustration of FIG. 1, the architect may experience over enthusiastic customers and thus desire to limit the customers' supply of paper upon which to provide comments.

To achieve effective reuse of artificial reality artifacts, four basic steps are required:

(1) Finding existing artifacts that approximately match the new specifications;
(2) Determining how close the existing artifacts are to those needed for the new application;
(3) Using the most specific editor to make the artifact precisely what is needed for the new application; and
(4) Connecting and/or introducing the modified artifact to others within the new environment.

Artificial reality worlds are specialized to accomplish a particular task with a subset of cyberspace present in each world. Subsets may be pre-chosen to support the tasks to be accomplished, such as the design of the skyscraper illustrated in FIG. 1. However, even with pre-chosen artificial reality worlds, it is still necessary to search for things that are not available within the current world. To allow this, artificial reality environments support switching from one world to another, movement through a single world, and the creation of information displays as the user moves through cyberspace. The methods of movement through cyberspace are referred to herein as semantic navigation.

The general problem in constructing visual views of information for a user is how to assign positions to elements so that the organization or structure of the information is maximally apparent to the user. A general solution to this problem probably does not exist, and experience has shown that the optimum method of position assignment for one set of information may be totally inappropriate for another set of information.

Constructing spatial representations of the interconnection of elements is a powerful method of coping with the size and complexity of cyberspaces of information. However, a new set of problems is raised by such representations, which is associated with navigating in a virtual space. These problems of navigation can be grouped into two categories: recognizing locations and controlling locations. One solution to the problem of allowing a user to know where the current viewpoint is in an artificial reality world is navigation aids similar to those found in the real world. Artificial realities can provide tools similar to maps that show the current position of an observer in the x-y and x-z planes. In addition, structures similar to landmarks may be either provided specially or just occur naturally when elements form groups that, with experience, become recognizable by the operator.

Alternatively, artificial landmarks can also be provided. For example, a simple ruler-like device could show the viewer how far from the center of the knowledge web his viewpoint is currently located and in what direction therefrom. One of the most important goals of an interface between the user and the artificial reality world is to make the user experience a real, N-dimensional space. That is, to allow the user to see and manipulate the information itself on a display screen rather than to simply do things which, in turn, manipulate an unseen system. The movements that control the real world should map directly into the virtual world of the artificial reality.

Another technique of semantic navigation within an artificial reality is that of absolute movement or teleportation. Artificial realities may fulfill the desire to teleport instantly from one location to another by supplying an abstract map of the cyberspace and allowing the user to point to locations on the map for changing the viewpoint within the cyberspace. Once an observer has spent the cognitive and computational energy to travel to some place within a cyberspace, the chance of needing to go back to that same location increases dramatically. Thus, teleportation allows the user to pick up a recent cyberspace contact location from a two-dimensional list or menu and instantly move back there. For example, the user could move from his current location within a cyberspace to a library, make a copy of an artificial reality artifact, and then teleport back to the original location and add that artifact element to the current world.

Browsing within a cyberspace typically involves examining elements of the artificial reality world one at a time, observing which elements are related to the one under examination, and then following a selective relationship to examine other elements. Hyperspace movement is particularly useful in large cyberspaces in which the relationship among elements is not easily recognized and in situations in which a user is searching for an element similar or related to one that has been found.

Extremely large cyberspaces of information may include hundreds or even thousands of artificial reality worlds. Navigating between these worlds is certainly possible with various known movement methods, but even move desirable is a concept that provides easy access to the core worlds in which a designer has the most interest and the ability to extend the core set.

For unexplored areas a technique is also needed for creating dynamic signposts that guide exploration. As the number of artifacts goes up, the energy associated with moving between the most commonly used artifacts must also remain reasonable in the context. One navigational technique that has the possibility of being extremely powerful within the realm of semantic navigation is that of "muscle memory." This technique involves the development of automatic reactions within an operator in response to a graphical stimulus. Such a technique requires very little cognitive attention during routine movements and during navigation in new territory, and it supports the formation of stimulus-response associations within the operator.

Various video disk-based games appear to develop such muscle memory responses to visual stimuli, while other basic screen-oriented text editors that bind commands to arbitrary keystroke sequences work in a similar fashion. It appears that the user forms an association between visual stimuli and muscle responses despite the fact that certain factors work against the user in this development. In the video games, the designers deliberately give very few advance clues as to which reaction the user must take. In the editing systems, the keystrokes are largely non-mnemonic and are subject to arbitrary change at a user's whims. The fact that muscle responses continue to develop even in the face of such adversity indicates that these responses include a powerful technique for semantic navigation within cyberspaces.

Use of Icons Within Information Spaces

Figure 2:
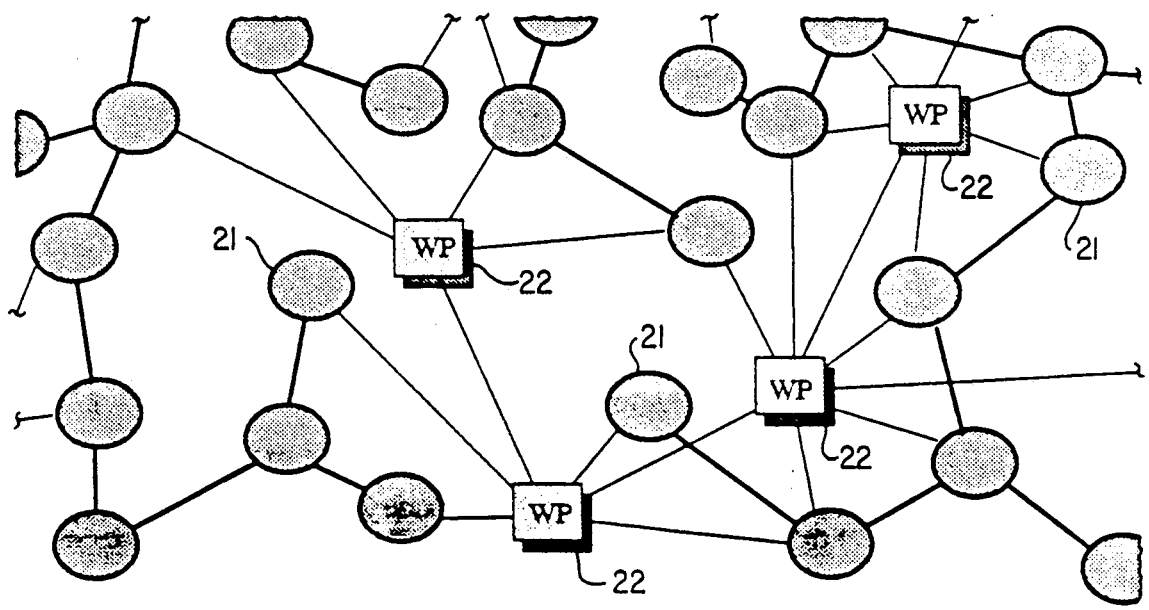
FIG. 2 is a diagram that illustrates an artificial reality containing nodes and waypoints.

FIG. 2 shows a set of artificial reality worlds that are depicted by circles 21 located within a cyberspace of information. One can navigate among the worlds 21 either by pointing to a particular world and teleporting there or by following the interconnection between the worlds. An inherent problem is that as the number of worlds within the artificial reality increases, so does the amount of cognitive energy required either to search the abstract map of the world or to follow the links between the worlds. Also shown in the cyberspace of FIG. 2 is a plurality of squares 22 labeled "WP." This plurality of squares represents a plurality of additional worlds that are referred to as "waypoints" worlds herein. These waypoints 22 enable the user to establish passways and connectivities between similar artificial reality worlds 21. The intention is to allow navigation to proceed at a higher level. Instead of moving from world to world, one can move between groups of worlds that have been clustered by users in accordance with individual criteria. In effect, the waypoints 22 provide shortcuts along frequently travelled routes between worlds 21.

Figure 3:
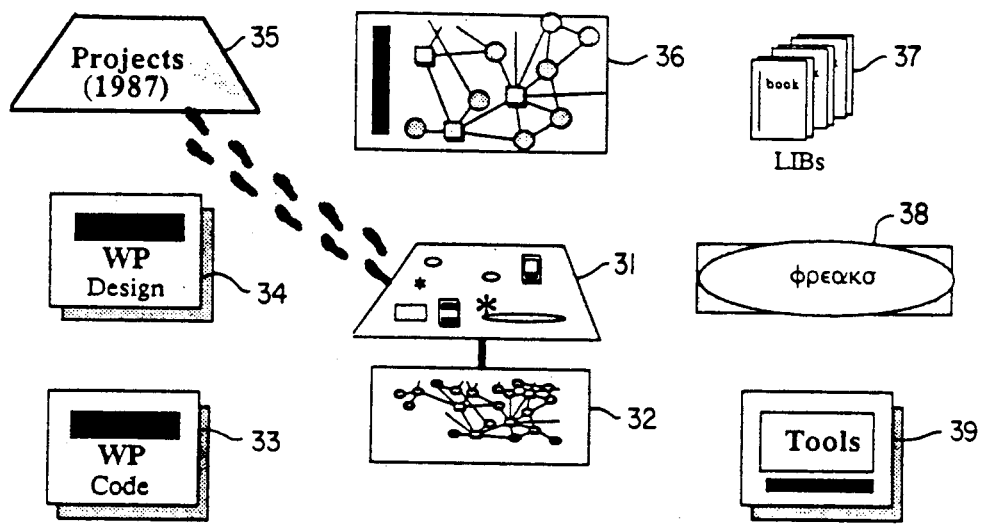
FIG. 3 is a diagram showing the use of an automatic icon within a waypoint of the artificial reality illustrated in FIG. 2.

FIG. 3 shows a sample of one of the waypoint worlds 22, which includes a central icon 31 containing landmarks such as a bird's-eye view of the graph 32 for establishing the user's current position and contacts within the world. Around the border of the waypoint world of FIG. 3 are branch points that are represented by icons 33-39. These points provide possible directions for the user to move from within the waypoint. These branch points lead to artificial reality worlds 35-39 and to other waypoint worlds 33 and 34, represented by the abbreviation "wp". Their purpose is to present to the user a stimulus that contains information required for making a branch selection in order to move from within the waypoint. Selecting a particular branch moves the user toward the desired world. Once the user acquires proficiency with the waypoint movement within worlds, sequences of selections allow him to move to any one of a large number of worlds. The number of worlds is determined by the number of branch points on a waypoint and the length of the selection sequence between the branchpoints.

Possibility Space and the Creations and Editing of Automatic Icons

In waypoint navigation, the user is effectively editing an N-tuple that represents his position within cyberspace. If the user's position is considered to be an artificial reality artifact that is edited by navigation, the concept can be extended to the editing of other similar artifacts. That is, the user has available a definition of an N-tuple that represents the position in a cyberspace. If each axis of the space represents a vector of values of interest, a possibility space can be constructed. Navigating through the possibility space can produce an N-tuple for use as a parameter of an artificial reality artifact. As shown in FIG. 3, each of the branch points gives information about which world the user will be in or what contacts the user will have if the branch is taken. This is done by taking a subset of the semantic information about that world and encoding it into appearance features of an iconic display as shown in FIG. 3. For example, one can give all icons representing waypoint worlds a square shape. Worlds where Newtonian physics apply might be represented by red icons, and worlds created by the user might have larger icons to illustrate their relatively greater importance. An inherent problem is that the total amount of information the icon stands for is more than can be effectively encoded using common techniques, i.e., shape, size, position, texture, annotation, animation, etc. Thus, small segments of data must be taken that comprise subsets of the total information available in the system. In addition, the required subset of information changes, depending on the reason for the user's movement or search. This reason is a function of the relationships defined to be moved through the information space.

Therefore, the N-space navigation concept can be applied directly to the problem of defining the mappings of semantic information into graphical shapes and appearances used in automatic icon systems.

The problem inherent in defining semantic information by iconic shapes is tripartite. First, it is necessary to determine which subset of information is most important to the current search. For example, the mathematical relationships forming the basic parameters for defining the subsets of information and assigning priorities to them may be structured in accordance with a "degree of interest function," as discussed in "Generalized Fisheye Views," *Proceedings of CHI '86 Human Factors In Computing Systems* (ACM New York 1986).

A degree of interest may, in turn, be composed of two parts: first, the importance of the object itself, which is determined by the combination of the content of the object's semantic information and the view desired (for example, piping information is a high priority of interest for the plumber's view). Second is the semantic distance related to the user's location in the cyberspace, i.e., things that are near to the user are closer in semantic distance and higher in interest. Thus, if the plumber is considering the second floor, piping that is on or passes through that floor has a much higher degree of interest than piping on the other floors. Once the relevant information is selected, a set of graphical iconic shapes can be constructed that associates visual features with various parameters of interest to represent that information. This maybe done by putting together combinations of appearances and features using the various graphical techniques available. These features may include size, color, position, annotation, shape, texture, movement, combinations of shapes, and many other representations.

Finally, a set of mappings can be established between the first set, i.e., the selected semantic information, and the second set, the graphical iconic representations of that information. This can be done statistically by direct composition of the relevant mathematical functions and relationships, or it can be done dynamically using the navigation techniques described above in association with the use of an automatic icon system as set forth below.

In the dynamic technique, a waypoint world defines the mappings of interest. These special worlds decompose the N-dimensions to be mapped into discrete segments of data that are manageable by the human user. For example, one may use a function space that allows access to a sine function. This function can then be used to produce a vector of values.

In these waypoint worlds, navigational artifacts or templates can be used that comprise a representation of an automatic icon display. The automatic icon system comprising a graphical representation and its associated set of mathematical relationships is carried with the user as the data within the information space is navigated. This icon system specifies for the user the nature of and properties of the potentially interesting parameters within the space being inspected.

Figure 4:
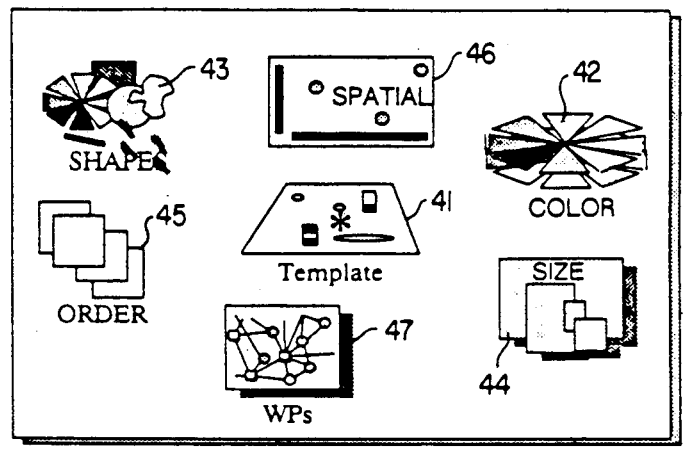
FIG. 4 is a schematic illustration of a base waypoint for automatic icons.

FIG. 4 illustrates a concept of what a base waypoint for an automatic icon system could look like. At the center is a graphical template 41 that is taking shape and is to comprise the automatic icon's graphical display portion. Around it are some of the possible worlds that can be entered to manipulate the display and a waypoint 47 to other groups of worlds. For example, the user can choose to enter a color artificial reality 42 in which motion along the three axes corresponds to a continuum of changes in the red, green, and blue components of the display's color within a preselected range of values. By combining this world's capabilities with others such as a function space, the user can specify how the display's color will vary in accordance with a semantic value, such as distance from the user. In addition to the core waypoints that handle the simple visual features of the automatic icon template 41, such as shape 43, color 42, and size 44, there are specialized waypoints by which the user can access the more esoteric artificial realities that allow manipulation of such unusual iconic properties as order 45 and spatial qualities 46. One of these specialized waypoints is illustrated in FIG. 5.

Figure 5:
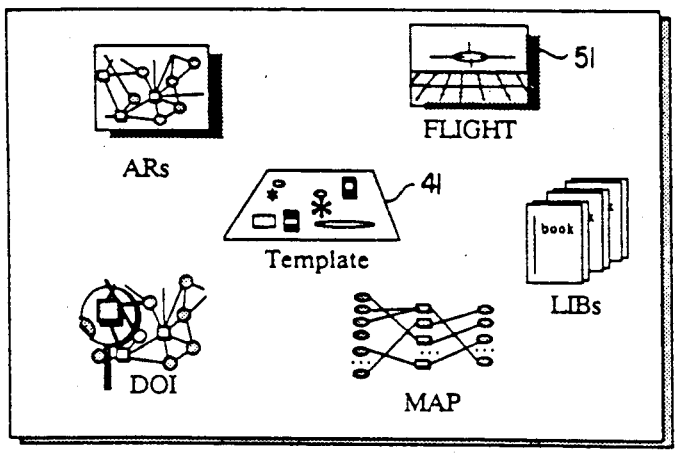
FIG. 5 is a schematic illustration of a specialized waypoint allowing selection of automatic icon properties.

As shown in FIG. 5, an illustrative artificial reality is the "flight rules" artificial reality 51 wherein the user is allowed to operate at a meta-property level. Actions in this artificial reality control the way the base artificial realities affect objects within them. To return to the color example, one might use the flight rule artificial reality 51 to modify the color artificial reality 42 so that the x, y, and z dimensions represented hue, saturation, and brightness.

Thus, the user achieves automatic icon generation by specifying vectors of values and, in essence, constructing a "virtual icon space" from which can be drawn any icon needed to represent any combination of the semantic values specified earlier.

Note that an icon may comprise either a single icon or a group of icons. The resulting graphical display features may be either contiguously arranged or spatially separated from one another.

The icon space can be conceived as analogous to the earth's magnetic field and the graphical template as analogous to a compass. Positioning the observer in the earth artificial reality and moving within it causes the position of the compass needle to change. There is no fixed set of compass positions; instead, the compass is sensitive to a property of the space it inhabits. Similarly, the user makes his automatic icons sensitive to the spaces they inhabits; like the compass, they will change when moved in that space. Rather than having a multiplicity of tools for recording vectors of values, the user simply makes the iconic graphical display template sensitive to all the variables in the artificial reality.

In addition to navigation and automatic generation of icons for new objects, semantic navigation can be used to construct an aid in visual searches. For example, if there is an artificial reality that needs to be searched, one could build an artifact with an automatic icon system comprising a graphical display and its associated set of mathematical relationships. Once constructed, this automatic icon artifact can be moved into the information space to be searched. The results of the search are the objects that are most closely correlated. The search and correlation is done by computer since the shape is simply an encoding of an N-tuple of semantic values. More importantly, however, searching is done directly by the user, who exploits human pattern and shape-matching capabilities to interface with and grasp large cyberspaces of information.

An automatic icon can be constructed so that the icon system selectively emphasizes and deemphasizes particular features from a plurality of features that are potentially interesting to the user. In essence, the automatic icon is a visual encoding of information that enhances or de-emphasizes certain features of the information as it is moved through the data within the information space.

Furthermore, the automatic icon may be responsive to mathematical spaces so that one can selectively program continuous functions, discrete functions, and/or discontinuous functions.

The utility of the automatic icon is the management of information systems. In reality, the automatic icon acts as an interface between the user who is trying to meaningfully inspect, select, or otherwise deal with the data within an information system. It is a tool that enables the user to interact with the data. It allows the user to see the information with which he is interacting so that he can use the data more meaningfully. The icon is also a limited editor since only part of the information is available for editing. Any information changed reflects itself back into the icon. To edit other features it is necessary to change the icon, change a feature of the icon, change the mapping between the feature and the icon or change the way in which the feature is mapped into the icon.

An additional aspect of an automatic icon system is that it provides a way for a user to deal with computers that are tied together among different non-homogeneous knowledge bases in diverse locations. The automatic icon may have built into it the structure of the space that it is going to search even though it doesn't know what data is actually present within that space. That is, the icon system can be defined in such a manner that it relates to the particular possibility space even though the reality of what is within that space is unknown.

Implementation of Automatic Icons

The concept of an automatic icon system to navigate through and interact with the other artifacts comprising artificial realities is a powerful tool for providing an interface between a user and vast expanses of information space. In implementing such an automatic icon, one must first define boundaries for the information system by selecting and defining boundaries for the information that comprise the system. For example, the defined system might include the last five years of a company's design of software products stored in a particular database. The next step is to determine all possible parameters that are potentially interesting to the user. Semantic units of potential interest are defined as dimensions within the boundaries of the information space.

In many computer-based implementations of the present invention, the information contained within the system comprises data in a numerical array. Thus, communication between a user and the data must take the form of mathematical computations if meaningful information is to be extracted from the data. A set of mathematical relationships is selected to define each of the parameters of potential interest to the user. These mathematical relationships may be software or hardware coded as is well known in the art. The chosen embodiments of these mathematical relationships are capable of interfacing with segments of data contained within the system and providing a computational indication of the degree of correlation between each segment and each parameter. Correlation is used in the broad sense of some predetermined relationship between elements rather than as a mere comparison for determining similarities of one element to the other.

Deciding what the automatic icon system should be sensitive to within the cyberspace and selecting particular mathematical relationships to reflect sensitivity to those parameters is directly related to the purpose for which the icon system is being created. If the icon is to search and inspect data fields, the mathematical relationships should be sensitive to the parameters and dimensions of the information space that are interesting to the user.

The display of the automatic icon system is designed to incorporate features that correspond to each of the parameters of potential interest defined, respectively, by each of the mathematical relationships in the set. Each feature of the visual display is capable of assuming various appearances and conditions throughout a range of possible conditions. The range of variation of different possible conditions may be either continuous or discontinuous. For example, the concept of time could be represented as a color chain varying from white to yellow to connote the yellowing of paper over the passage of time. A continuous parameter of interest, such as a trigonometric function, could be represented by a continuous appearance function such as a color wheel, which presents a continuous range of different possible appearance conditions. A discontinuous parameter could be represented by a sequence of images of polygons with each of the total number of sides thereof representing a different possible condition.

Once a visual display is defined using, for example, object-based programming techniques so that each visual feature can assume various conditions over a potentially infinite number of different possible conditions, the set of mathematical relationships is connected with the visual display generator. The parameters defined by each mathematical relationship are associated with a corresponding one or more of the features of the display by, for example, writing a set of programming functions or subroutines which map the values of the parameters to the corresponding display features in a manner well known in the art.

Communication between the automatic icon and the information contained in the information system may take various forms. In general, it consists of a request for information from the icon system to the information system into which the mathematical relationships of the icon system are to be moved. If the information system is a computer database, the information request may take the form of one or more database queries. Then, the information system responds with a return representation. The icon system may be provided with a selection of different communication tools that enable it to interface its mathematical relationships with various objects and query languages encountered within the information space.

When the mathematical relationships of the automatic icon systems are moved through the information contained within the boundaries of the information system, a changing visual display is produced for the user. This movement may be accomplished in accordance with the techniques of semantic navigation between and among artificial reality worlds as discussed earlier and implemented with database queries. As such movement occurs, the features of the display assume various conditions that indicate to the user the degree of correlation between the associated parameters and the segments of information through which the embodiments of the mathematical relationships are passing. The result of the computational interaction may, for example, be normalized and mapped into a one-dimensional continuum so that each feature of the visual display associated with its particular respective parameter in the icon is adjusted to accommodate the correlation.

From this understanding of the automatic icon system it should be clear that a plurality of different systems could be superimposed over one another. That is, each icon system acts as a type of filter for the data by emphasizing certain features of the data and deemphasizing others, depending upon the sensitivities of the mathematical relationships of the icon. A second icon system with a different set of mathematical relationships and thus a different set of sensitivities can then be used on the results of the first system to further refine and define the information graphically presented to the user.

Several techniques are available for using an automatic icon to inspect and search an information system. For example, the icon can be moved through the information so that the user can determine the degree of correlation or likeness between the icon and individual segments of information by observing the appearance of the display as the icon is moved. Alternatively, the user can move the icon through the information until the display assumes a desired appearance. Then the user can note the location of the icon within the space, thus correlating the location with the nature of the content. Clearly, the automatic icon system of the present invention can be used not only to inspect information within a cyberspace but also to modify and interact with that information. The set of mathematical relationships must access the information in the information system to produce a computational result and a corresponding change in the appearance of the features in the icon system's graphical display. The visual display may enable the user to interact with its features to express a desired change in the relative value of correlation between a selected parameter and the segment of information being accessed by the mathematical relationships. The content of the information is then computationally changed so that the relative value of correlation desired by the user is detected by the mathematical relationship accessing the data.

Once an automatic icon system is constructed for a particular application, it can be stored for later editorial modification and/or retrieval and reuse for other purposes. If a selection of icon systems is available, one should choose the system whose characteristics approximate those desired for the new use. The next step is to determine how closely this system matches the desired specification. A most specific editor is used to modify the features of the display, the mathematical relationships, and the interrelationships between them to construct an automatic icon system that precisely fits the new application. As noted earlier, editorial modification of an automatic icon system can include changing the icon, changing the features of the icon, changing the mapping between the feature and the icon, or changing the way in which the feature is mapped into the icon.

Figure 6:
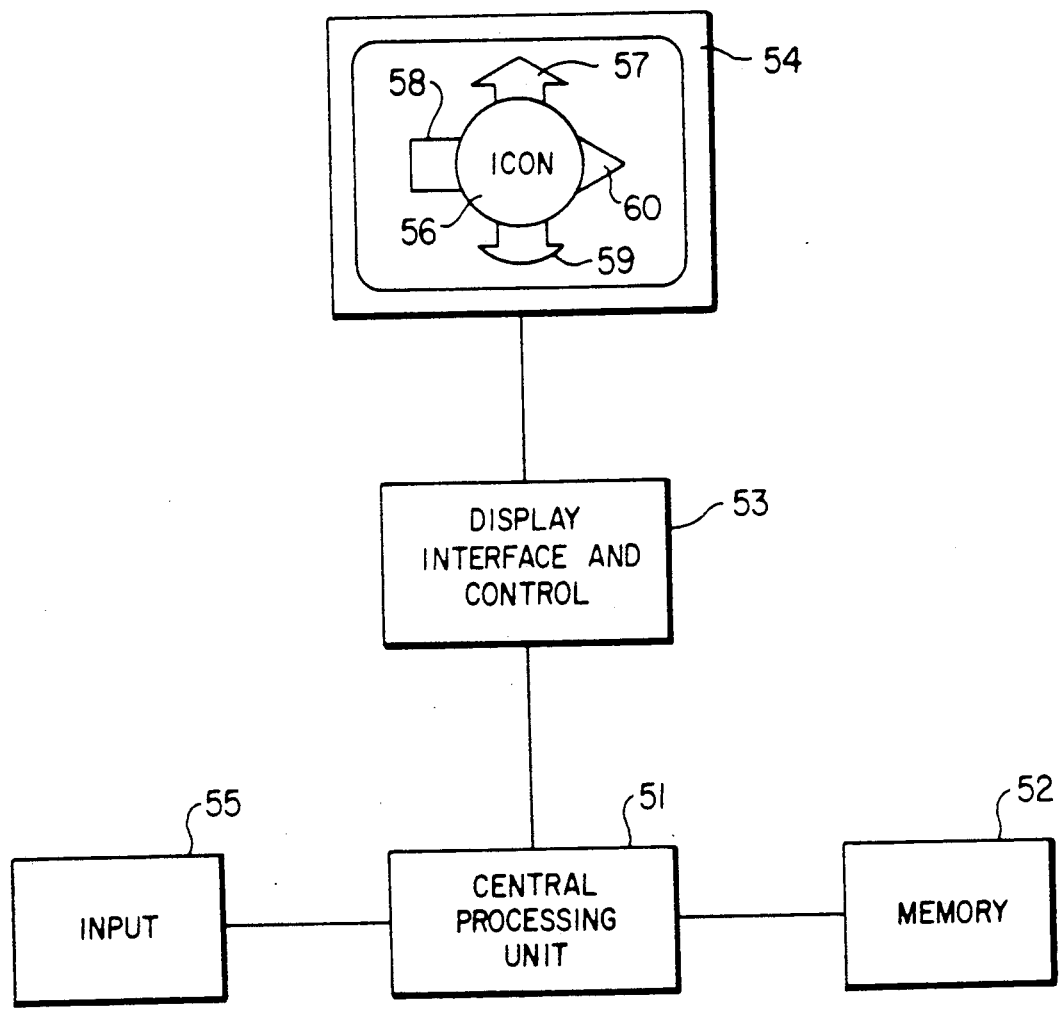
FIG. 6 is a block diagram of an interface system constructed in accordance with the criteria of the present invention.

FIG. 6 shows a block diagram of a computer system that supports the implementation and use of an automatic icon constructed in accordance with the specifications of the present invention. The system includes a central processing unit (CPU) 51 that can store data that represents various mathematical relationships and that can perform various computations as is well known in the art. The processor 51 is connected to a display interface and control 53 that is in turn linked to a visual display monitor 54. The monitor 54 can generate a visual display in response to signals from the display interface 53 under control of the processor 51. An input module 55, such as a keyboard, is provided for user entry of control signals to the processor 51.

In one embodiment of the system shown in FIG. 6, the data to be interfaced is stored in the memory 52. The data can be in various formats, including semantic networks or a large cyberspace of information comprising the artifacts of a plurality of worlds. The processor 51 is connected to the memory 52 to access and interact with data stored therein. The display interface and control unit 53 is connected to the CPU 51 and to the display monitor 54. The display interface and control 53 and monitor 54 can generate a visual display icon 56 with a plurality of different visual features 57, 58, 59 and 60, each of which can assume a plurality of different possible appearances; for example, ranging through a continuum of possible appearances.

A set of mathematical relationships is stored within the processor 51. This set of relationships is preselected to define a plurality of parameters that are potentially interesting to the user. Each mathematical relationship is capable of indicating a degree of correlation between each parameter defined by that relationship and a segment of data contained within the memory 52. In response to computational interaction between each mathematical relationship within the set and the information stored as data in memory 52, which is performed by the processor 51, the processor controls the display interface 53 that controls the appearance of the icon features 56 generated on the monitor 54. The computations indicate the relative value of correlation between each parameter and each discrete segment of data with which it comes in contact. The computations also control the interface 53 so that it generates on the monitor 54 a corresponding appearance in each associated feature 57-60 of the icon 56.

With the processor 51, the user accesses and examines successive discrete segments of data within the memory 52—either automatically or under manual control via the input 55. As the region of access of the processor 51 is moved, the mathematical relationships of the automatic icon system are brought into contact with a sequence of different discrete segments of data that are stored in the memory 52. This contact causes the processor 51, the display interface 53, and the monitor 54 to automatically generate an icon 56 with features 57-60, whose changing appearance indicates the relationship between the parameters of interest to the user and the particular segments of information within the memory 52 to which the mathematical relationships have access at successive periods of time.

The user may also be provided with controls via the input 55 that enable him to modify the appearance of the features 57-60 of the icon 56. This modification can indicate a desired change in the relationship between the mathematical relationships and the segment of data within the memory 52 that is being accessed at that time.

In one mode of operation the processor 51 can include means for interacting with and modifying the mathematical structure of the data in the segment of memory 52 so that its correlation with the mathematical relationships of the icon system is altered as the user desires.

For example, the system can be implemented with a dual-processor CPU, one interfacing the graphics system and the other containing the application program and accessing the knowledge base within the memory 52. The user interface layer can be written in one language to control the display and allow the knowledge base to be explored and altered through direct user manipulation of the graphic objects comprising the features of the icon 56. In the other processor of the CPU 51, the knowledge-base interface layer can be written in a different language and connect the application program and data in the knowledge-base to the user-interface layer through a control language. The two layers (the user-interface layer and the knowledge-base interface layer) can together comprise a general purpose system and connect with arbitrary knowledge-base applications contained within the memory 52.

In general, the automatic icon system of the present invention involves moving through and examining information within an information network by looking at that information with a set of criteria that can be conceptually viewed as templates or filters. The icon system automatically changes its visual representation to the human user, who participates in the examination as a function of what he or she is seeing while examining the data. The system can be programmed to go in a certain direction or pattern as it sequentially examines the data, moment to moment, and produce a display for the user to indicate the results of the examination. This enables the user either to search for something or to recognize when the examination has reached a location where the user desires to modify a part of the data and directly observe the results of that modification in the appearance of the features of the icon.

The system of the present invention comprises a powerful tool for handling cyberspaces of information in a manner not heretofore possible.

Having described the invention and certain specific embodiments thereof, it is understood that further modifications may now suggest themselves to those skilled in the art, and such modifications are now covered as fall within the scope of the following claims:

What is claimed is:

1. A system for enabling a user to interact with information contained within an information system, comprising:
   means for defining boundaries of the information system containing the information with which the user is to interact;
   means for providing a set of mathematical relationships that define a plurality of parameters of potential interest to a user, said mathematical relationships indicating the degree of correlation between the parameters defined by the relationships and segments of information contained within the defined boundaries of the information system;
   means for defining a visual display for the user that has a plurality of iconic representations having different visual features, the iconic representations and visual features assuming various conditions out of a range of different possible conditions determined by the segments of information;
   means for associating said set of mathematical relationships with said visual display to associate the parameters defined by the mathematical relationships with corresponding iconic representations and visual features of said display; and
   means for moving said set of mathematical relationships through the information contained within the boundaries of the information system to produce a visual display for the user in which the iconic representations and visual features of the display assume various conditions in accordance with the degree of correlation between the associated parameters of interest to the user and the segment of information within the information system through which the mathematical relationships are passing.

2. A system for enabling a user to interact with information contained within an information system as set forth in claim 1 wherein:
   said visual display defining means also includes means for enabling the user to interact with the iconic representations and visual features of the display to provide input regarding a user desired change in the degree of correlation between a selected parameter of interest and an associated segment of information; and
   said mathematical relationships include means for changing the content of the segment of information through which they are passing to establish the degree of correlation therebetween desired by the user as indicated by the user's interaction with the display.

3. A system for enabling a user to interact with information contained within an information system as set forth in claim 1 wherein said visual display comprises an icon having a plurality of visual elements, each element being capable of assuming different appearances varying through a range of appearances.

4. A system for enabling a user to interact with information contained within an information system as set forth in claim 1 wherein said mathematical relationships produce an indication of degrees of correlation by comparing portions of said relationship with portions of said segments of information.

5. A system for enabling a user to interact with information contained within an information system as set forth in claim 1 wherein said means for defining the boundaries of the information system include storing the information as data within a memory.

6. A system for enabling a user to interact with information contained within an information system as set forth in claim 1 which also includes:
   means for changing the visual features of said visual display.

7. A system for enabling a user to interact with information contained within an information system as set forth in claim 6 which also includes:
   means for storing representations of individual visual displays having particular sets of visual features for subsequent recall and use in said system.

8. A system for enabling a user to interact with information contained within an information system as set forth in claim 1 which also includes:
   means for changing the manner in which said set of mathematical relationships are associated with said visual display to change the way in which the parameters defined by the mathematical relationships are associated with the corresponding iconic representations and visual features of said display.

9. A system for enabling a user to interact with information contained within an information system as set forth in claim 1, which also includes:
   means for modifying the iconic representations and visual features of said visual display and said means for associating said mathematical relationships with said display to change the appearance of selected iconic representations and visual features in response to a particular degree of correlation between a parameter of interest and a segment of information through which its associated mathematical function is passing.

10. A system for enabling a user to interact with information contained within an information system as set forth in claim 1 wherein said information system boundaries define a cyberspace.

11. A system for enabling a user to interact with information contained within a cyberspace as set forth in claim 10 wherein said moving means comprise a semantic navigation system.

12. A system for enabling a user to interact with information contained within an information system as set forth in claim 1, which also includes:
means for selectively changing said set of mathematical relationships to change the parameters of potential interest to the user.

13. A system for enabling a user to interact with information stored as data within an information system comprising:
memory means for storing the data;
processor means connected to said memory to access selected segments of the data;
display means connected to said processor;
means for generating an icon on said display means, said icon having a structure and a plurality of features which change in appearance through a range of different possible appearances;
a set of mathematical relationships contained within said processor and defining a plurality of parameters of potential interest to the user, said mathematical relationships being capable of producing an indication of a degree of correlation between the parameters defined by the mathematical relationships and segments of data;
means responsive to an indication of a degree of correlation between each parameter defined by each of said mathematical relationships and segments of data for generating a particular corresponding appearance in the structure and associated features of said icon; and
means for moving said mathematical relationships within said processor into access with a sequence of discrete segments of data stored within said memory to automatically generate an icon structure with features whose appearance indicates the relationship between parameters of interest to the user and the particular segment of data with which the mathematical relationships have access at each sequential period of time.

14. A system for enabling a user to interact with information stored as data within an information system as set forth in claim 13, which also includes:
means for enabling the user to interact with the structure and features of said icon regarding a change desired by the user in the relative value of correlation between a selected parameter of interest and an accessed segment of data; and
means within said processor for changing the content of the segment of data being accessed to establish the relative value of correlation between the data segment and the mathematical relationship associated with the structure and features of the icon changed by interaction therewith by the user.

15. A system for enabling a user to interact with information stored as data within an information system as set forth in claim 13, which also includes:
means for editing said icon by changing the appearance of the structure and selected features thereof in response to particular degrees of correlation between particular ones of the mathematical relationships and discrete segments of data.

16. A system for enabling a user to interact with information stored as data within an information system as set forth in claim 13, which also includes:
means for editing said icon by changing the structure and features thereof generated on said display.

17. A system for enabling a user to interact with information stored as data within an information system as set forth in claim 16, which also includes:
means for storing representations of icons having particular structures and sets of features for subsequent recall and use in said system.

18. A system for enabling a user to interact with information stored as data within an information system as set forth in claim 13, which also includes:
means for editing said icon by changing the manner in which said set of mathematical relationships are associated with said icon display to change the way in which the parameters defined by the mathematical relationships are associated with the corresponding structure and features of said icon display.

19. A method enabling a user to interact with information contained with an information system, comprising:
defining boundaries of the information system containing the information with which the user is to interact;
providing a set of mathematical relationships that define a plurality of parameters of potential interest to a user, said mathematical relationships indicating a degree of correlation between the parameters defined by the relationships and segments of information contained within the defined boundaries of the information system;
generating a visual display for the user that has a plurality of iconic representations having different visual features, the features assuming different possible conditions;
associating said set of mathematical relationships with said visual display to associate each of the parameters defined by each mathematical relationship with a corresponding feature of said display; and
moving said set of mathematical relationships through the information contained within the boundaries of the information system to produce a visual display for the user in which the iconic representations and features of the display assume various possible conditions in accordance with the degree of correlation between the associated parameters of interest to the user and the segment of information within the information system through which the mathematical relationships are passing.

20. A method for enabling a user to interact with information contained within an information system as set forth in claim 19 wherein:
said visual display generating step also includes enabling the user to interact with the iconic representations and visual features of the display to provide input regarding a user desired change in the degree of correlation between a selected parameter of interest and an associated segment of information; and
changing the content of the segment of information through which said mathematical relationships are passing to establish the relative value of correlation therebetween desired by the user as indicated by the user's interaction with the display.

21. A method for enabling a user to interface with data contained within an information system as set forth in claim 19, which also includes:
modifying the iconic representations and features of said visual display and said means for associating said mathematical relationships with said display to change the appearance of selected iconic representations and features in response to a particular degree of correlation between a parameter of interest and a segment of information through which its associated mathematical function is passing.

22. A method for enabling a user to interact with information contained within an information system as set forth in claim 19, which also includes:
changing the iconic representations and visual features of said visual display.

23. A method for enabling a user to interact with information contained within an information system as set forth in claim 22, which also includes:
storing representations of individual visual displays having particular sets of iconic representations and visual features for subsequent recall and use.

24. A method for enabling a user to interact with information contained within an information system as set forth in claim 19, which also includes:
changing the manner in which said set of mathematical relationships are associated with said visual display in order to change the way in which the parameters defined by the mathematical relationships are associated with the corresponding iconic representations and features of said display.

25. A method for enabling a user to interface with data contained within an information system as set forth in claim 19, which also includes:
selectively changing said set of mathematical relationships to change the parameters of potential interest to the user.

26. A method for enabling a user to interact with information stored as data within an information system comprising:
storing the data in a memory:
selecting segments of the data with a processor;
generating an icon on a display means, said icon having a structure and a plurality of features which change in appearance through a range of difference possible appearances;
selecting a plurality of parameters of potential interest to the user and selecting a corresponding set of mathematical relationships, said mathematical relationships indicating a degree of correlation between each parameter defined by each mathematical relationship and discrete segments of data;
generating a particular corresponding appearance in the structure and associated features of said icon in response to an indication of a degree of correlation between each parameter defined by each of said mathematical relationships and segments of data; and
moving said mathematical relationships into access with segments of data stored within said memory to automatically generate an icon structure with features whose appearance indicates the relationship between parameters of interest to the user and the particular segment of data with which the mathematical relationships have access.

27. A method for enabling a user to interact with information stored as data within an information system as set forth in claim 26, which also includes:
enabling the user to interact with the structure and features of said icon regarding a change desired by the user in the degree of correlation between a selected parameter of interest and an accessed segment of data; and
changing the content of the segment of data being accessed to establish the relative value of correlation between the data segment and the mathematical relationship associated with the structure and features of the icon changed by the user.

28. A method for enabling a user to interact with information stored as data within an information system as set forth in claim 26, which also includes:
editing said icon by changing the structure and features thereof generated on said display.

29. A method for enabling a user to interact with information stored as data within an information system as set forth in claim 28, which also includes:
storing representations of icons having particular sets of structures and features for subsequent recall and use.

30. A method for enabling a user to interact with information stored as data within an information system as set forth in claim 26, which also includes:
editing said icon by changing the manner in which said set of mathematical relationships are associated with said icon display in order to change the way in which the parameters defined by the mathematical relationships are associated with the corresponding structure and features of said icon display.

* * * * *